United States Patent [19]

Schall et al.

[11] 4,182,087
[45] Jan. 8, 1980

[54] SWIMMING POOL

[75] Inventors: Frederick R. Schall, Westmont, N.J.; Frank L. Kessler, Broomall, Pa.

[73] Assignee: Esther Williams Swimming Pools, Delair, N.J.

[21] Appl. No.: 899,703

[22] Filed: Apr. 24, 1978

[51] Int. Cl.² ............................................. E02D 27/00
[52] U.S. Cl. .................................. 52/169.7; 405/278; 4/172.19
[58] Field of Search ....................... 160/235; 4/172.19; 52/169.7; 405/278

[56] References Cited

U.S. PATENT DOCUMENTS

| | | | |
|---|---|---|---|
| 933,665 | 9/1909 | Rafter | 405/278 |
| 2,354,485 | 7/1944 | Slaughter | 160/235 |
| 2,641,018 | 6/1953 | Snyder | 160/235 |
| 2,861,277 | 11/1958 | Hermann | 4/172.19 |
| 3,326,268 | 6/1967 | Dixon | 160/231 A |

Primary Examiner—James L. Ridgill, Jr.
Attorney, Agent, or Firm—Jay M. Cantor

[57] ABSTRACT

A swimming pool of circular or oval shape constructed of interleaved extruded aluminum panels with water containing liner secured thereto wherein hoop stresses in the pool walls from the water pressure are withstood along the panels and the joints therebetween. The pool walls are constructed from a plurality of interleaved extruded aluminum panels which are constructed so that when a pair of adjacent panels are positioned relative to each other in a first predetermined position, the male and female joint portions can be slid, one within the other with sufficient extra space or play to allow easy insertion and assembly. However, when the two adjacent panels are then rotated to a different angle relative to each other, the play or additional space is taken up and the adjacent panels become locked together in an essentially unitary construction. This is accomplished by providing a cam surface on one of the joint portions and a cam follower on the other of the joint portions so that, upon rotation of the panels relative to each other, the cam follower will ride up on the cam and take up any of the slack or tolerance in the joints. The panels are locked in the non-slack position after assembly. The joints are preferably positioned so that the joint portions other than the cam and cam follower portion, are substantially symmetrical on each side of each panel axis.

12 Claims, 5 Drawing Figures

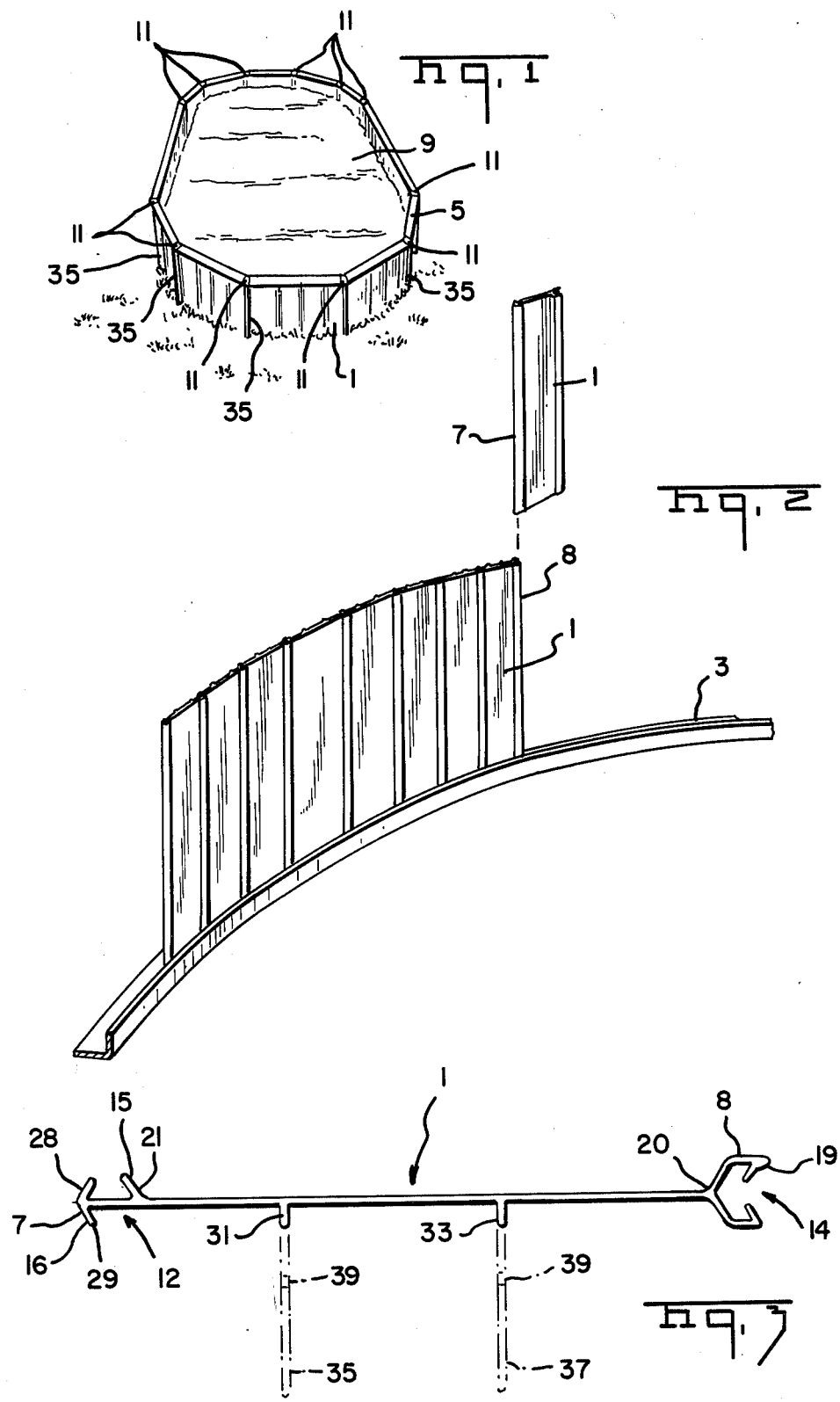

SWIMMING POOL

BACKGROUND OF THE INVENTION

1. Field of the Invention

This invention relates to aluminum extruded panels for use in forming the wall of a swimming pool wherein the panels themselves are capable of withstanding the hoop stresses encountered along the entire joint between adjacent panels.

2. Description of the Prior Art

The prior art in metal swimming pools has involved the use of sheet steel and sheet aluminum siding and extruded aluminum siding or walls. The prior art metal sheet siding, as applied to swimming pool construction, has been a continuous metal sheet wherein only a single joint was required. Joints of this type were at the seam where the metal sheet came to an end and overlapped itself and the sheet metal ends were secured together at the overlap. For this reason, the prior art swimming pools having sheet metal walls or siding, have been capable of taking or withstanding the hoop stresses themselves. On the other hand, the swimming pools formed from panels of extruded aluminum have been incapable of handling the hoop stresses at the joint securing adjacent panels together except in cases where the amount of aluminum used was excessively large in relation to the amount of water in the swimming pool and the forces applied by the water. For this reason, the prior art extruded aluminum swimming pools were economically incapable of competing with the sheet metal variety because the problem whereby the joint was incapable of handling the hoop stresses alone could be overcome only by the use of excessive metal, thereby driving up the cost. As an alternative, this problem was overcome by securing the panels in top and bottom rails (e.g. U.S. Pat. No. 3,736,599) or members which bore the load or hoop stresses from the water in the pool in a circular or other configuration, depending upon the configuration of the perimeter of the pool. These top and bottom rails also materially increased the cost of the pools made from extruded aluminum panels. However, it has been recognized that extruded aluminum walls have advantages over metal sheeting in that they are stiffer, have better aesthetic properties and, as compared with steel, are more corrosion resistant. It has therefore been a major objective in the arts to be able to produce an extruded aluminum panel swimming pool which is capable of competing with those formed from metal sheeting, not only on the basis of better stiffness and aesthetic properties, but also on the basis of economics.

SUMMARY OF THE INVENTION

This invention overcomes the prior art problems in producing swimming pools wherein the walls are formed from extruded aluminum panels by permitting an extruded aluminum panel pool to be built without the necessity of a large top and bottom rail and, theoretically, without a top and bottom rail at all. The elimination of the top and bottom rail alters the economics to the extent that an extruded pannel aluminum swimming pool can be produced at costs which closely approach those of sheet wall pools.

The reason why the prior art extruded aluminum panel wall could not be used without a top and bottom rail was that such wall was incapable of withstanding the hoop stresses at the joints between adjacent pairs of walls or panels. For this reason, when a sufficient amount of water was placed in the pool, the walls would rip apart at the joints due to the forces thereon. The reason for this inability of the joints to withstand the hoop stresses was that there was a certain amount of play or spacing between male and female members of an interlocking joint. This space was required in order to permit sufficient room to be provided in the female portion of the joint so that the male portion could be inserted therein during installation of the swimming pool. A problem was that this play or tolerance that was required could not be removed after pool installation and the only remedy was the use of the top and bottom rail as explained hereinabove.

In accordance with the present invention, there is provided a joint for joining an adjacent pair of extruded aluminum panels whereby the play to allow assembly of an adjacent wall pair is provided in one position of the wall pair relative to each other and this play or tolerance is removed when the adjacent wall pair is rotated to the position it will ultimately take in final assembly. This is accomplished by the use of a cam member on the female joint potion and a cam follower on the male joint portion, the cam and cam follower being remote from each other during insertion or assumbly of adjacent panel walls. However, when the adjacent walls are rotated relative to each other to their final position during installation, the cam will ride up on the cam follower and lock the joint portions together to provide a substantially integral member at the joint with no play or tolerance permitted. The remaining joint members other than the cam and cam follower are substantially symmetrical on both sides of the panel axis.

BRIEF DESCRIPTION OF THE DRAWINGS

FIG. 1 is a three dimensional view of an oval swimming pool in accordance with the present invention;

FIG. 2 is a perspective view of of the panels in accordance with the present invention being assembled;

FIG. 3 is a cross sectional view of a panel in accordance with the present invention;

DESCRIPTION OF THE PREFERRED EMBODIMENT

Figure 4:
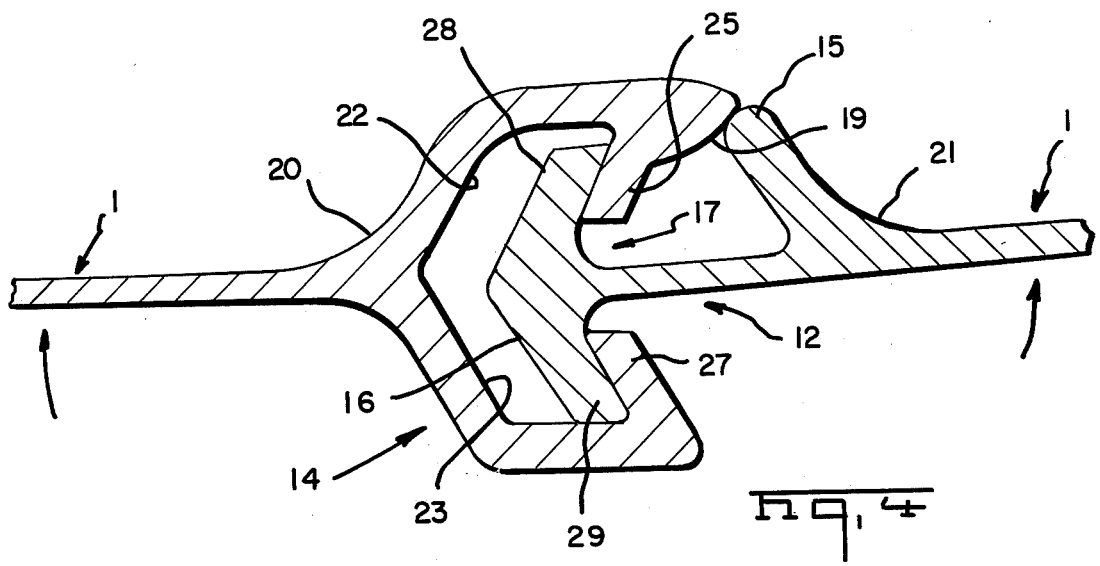
FIG. 4 is a top view of a pair of assembled panels in accordance with the present invention.

Referring now to FIG. 1, there is shown a typical oval swimming pool having a side wall which is formed from a plurality of interconnected extruded aluminum panels 1. A coping 5 is secured over the wall 1 with a coping cover 11 as will be explained in more detail hereinbelow. The coping 5 can be wide enough to form a walkway or deck either alone or in conjunction with other members secured adjacent thereto. A liner 9 is secured to the pool wall in a manner which will be explained hereinbelow.

Referring now to FIG. 2, there is shown a pool in accordance with the present invention in a partially assembled state. Initially, a guide rail 3 is provided having an L-shaped cross section and is merely for the purpose of allowing assembly of the pool wall in accordance with the predetermined shape (i.e., circular, oval, etc.). The wall is assembled by interconnecting extruded aluminum panels 1 along their joints 7 and 8 to form the wall in the manner which will be explained hereinbelow. It should be understood that the guide rail 3 is used solely for the purpose of shaping and can be removed after pool wall construction is completed or need not be used in the first place in the event that the shape of the outer pool wall has already been marked out. The guide rail 3 will bear essentially no hoop stresses and will have essentially no forces transmitted thereto by the panels 1 after pool assembly and filling of the liner 9 with water in standard manner.

Referring now to FIGS. 3 and 4, there is shown a cross section of an extruded aluminum wall panel 1 in accordance with the present invention. The panel 1 includes a male interlocking joint member 12 at one end of the panel and a female interlocking joint member 14 at the other end of the panel. The male member 12 is in the shape of an arrow which is symmetrical on both sides of the axis of the panel, the arrow portion being labelled 16. The male interlocking member 12 also includes a cam follower 15 in the form of an actuating lever. The interior of the female portion 14 is designed to accept the arrow portion 16 within the recessed portion 17 so that when the cam follower 15 is rotated away from the cam surface 19, as will be explained hereinbelow, there will be a sufficient amount of tolerance between the interior recess 17 and the arrow 16 to permit a pair of adjacent panels to be slid one within the other as shown in FIG. 2. The interior of the recessed portion 17 is formed by wall members 22 and 23 which can have the same or different radii of curvature and a pair of return flanges 25 and 27 which absorb the load from the angled portion 28 and 29 of the arrow 16. The reason for the inward direction of the flanges 26 and 27 is to provide greater strength against the forces applied thereto by the angled finger members 28 and 29 of the arrow portion 16.

The interior surface of the panel 1 including the curved portions at 20 and 21 are smooth in order to eliminate any sharp edges which would tend to damage a liner which rests thereagainst under the pressure of the water in the liner. The cam surface 19 is provided for movement thereagainst of the cam follower 15 after installation in a manner which will be explained hereinbelow. Each panel also includes ribs 31 and 33 which provide additional panel strength. Certain ones of the panels which form the pool wall will have extended ribs 35 and 37 and apertures 39 as shown in phantom in FIG. 3 which are used for securing the pool coping and other pool structure therein in a manner which will be described hereinbelow.

Upon installation, the panels 1 are positioned as shown in FIG. 2 whereby the members are rotated so that the cam follower 15 is rotated out of contact with the cam 19, thereby providing a great deal of tolerance between the male and female joint portions and allowing adjacent panels to be slipped or interleaved from top or bottom very easily in the manner described in FIG. 2. When the panels are fully interleaved in the manner shown in FIG. 4, the walls are rotated relative to each other as shown by the arrows in FIG. 4 so that the cam follower 15 rides up on the cam 19, thereby forcing the fingers 28 and 29 into intimate and pressure contact with the flanges 25 and 27 and allowing no tolerance or play therebetween. The tolerance or play that was present during assembly has been removed by the rotation of the adjacent wall panels relative to each other in the direction shown by said arrows in FIG. 4 and the two panel members are rigidly forced against each other. The members are therefore locked into a unitized load bearing assembly wherein there is no capability of lateral movement of the panels relative to each other. It can therefore be seen that, when adjacent panel members are oriented in a first predetermined position relative to each other, male and female joint members can be engaged due to the built in tolerance, this tolerance or play being removed by the adjacent walls assuming a second relative position with respect to each other to provide a rigid structure without availability of lateral movement of any two adjacent panels relative to each other. The connection has sufficient strength to withstand the forces that are applied against the joint, this being the hoop stresses. A desirable feature to accomplish this is to have the male and female joint portions 12 and 14 symmetrical about the panel axis except for the cam and cam follower so that the hoop stresses from one panel to the next are transmitted along a continuous plane.

Figure 5:
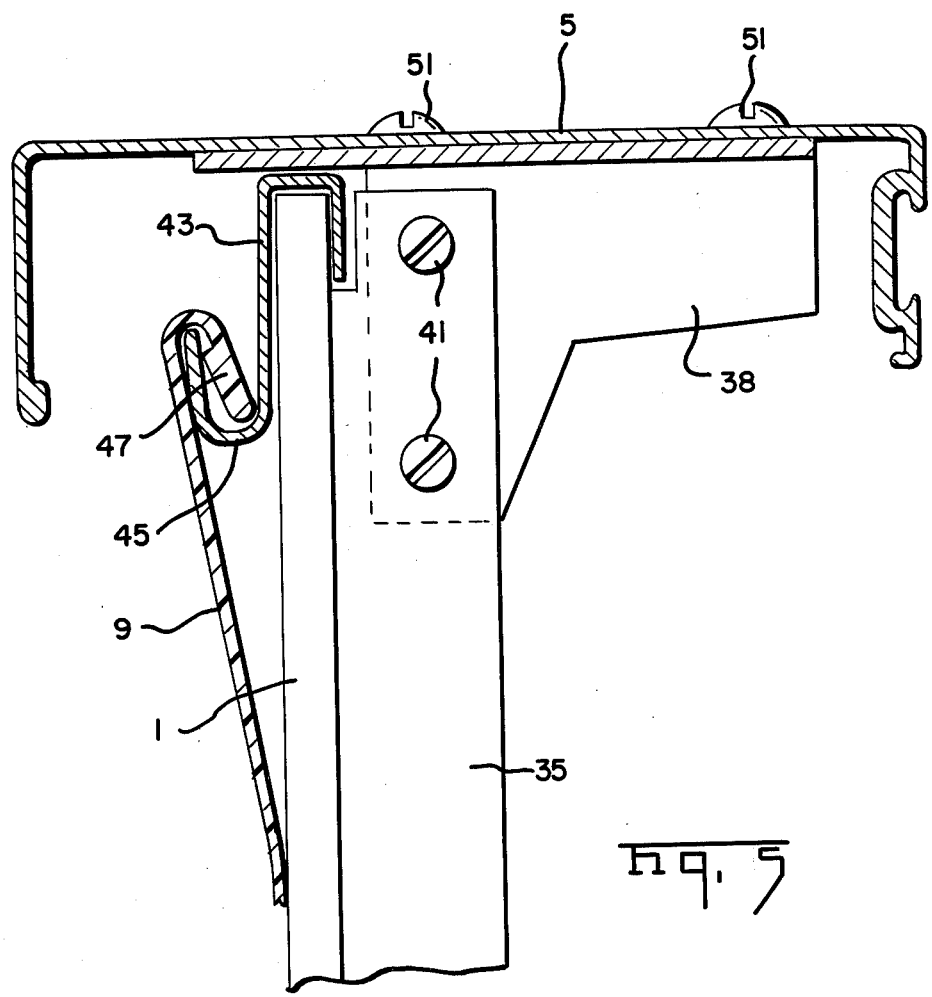
FIG. 5 is a section through the assembled pool of FIG. 1 showing all of the pool component parts in assembled condition.

Referring now to FIG. 5, there is shown a section through an assembled pool. The pool includes the side panels 1 which form the wall with a rib 35 having an aperture 39 therein through which a bolt 41 is positioned. The bolt 41 secures a top clip 38 in position over a bead receiver 43 which includes a loop portion 45 for receiving the bead 47 of the liner 9. A coping 5 is secured to the top clip 38 by means of screws 51. It can therefore be seen that a swimming pool formed by interconnected extruded aluminum panels is provided which is easily assembled and which does not require top and bottom rails for withstanding the hoop stresses.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A panel for forming a swimming pool wall which comprises:
    (a) a rectangular extruded aluminum member comprising top, bottom and first and second side edges, one of said side edges defining a male joint portion and the other of said side edges defining a female joint portion, a said male joint portion being loosely lockingly longitudinally receivable within a female joint portion when said male portion is in a first predetermined orientation relative to said female portion,
    (b) means secured on the panel and external of said male and female portions disengaged when said male and female joint portions are in said first predetermined orientation, responsive to rotation of said male portion relative to said female portion in a predetermined direction to engage for rigidly locking a said male portion within a said female portion.

2. A panel as set forth in claim 1 wherein said means external includes means on said side defining said male joint portion which includes a cam follower and said side defining said female portion includes a cam whereon a said cam follower rides during said rotation.

3. A panel as set forth in claim 2 wherein said male portion includes an arrow portion substantially symmetrical about the plane of said rectangular member and said female portion includes a pair of inwardly directed flanges substantially symmetrical about the plane of said rectangular member.

4. A panel as set forth in claim 3 wherein said rectangular member includes rib means formed in an outer wall surface thereof.

5. A panel as set forth in claim 1 wherein said male portion includes an arrow portion substantially symmetrical about the plane of said rectangular member and said female portion includes a pair of inwardly directed flanges substantially symmetrical about the plane of said rectangular member.

6. A panel as set forth in claim 5 wherein said rectangular member includes rib means formed in an outer wall surface thereof.

7. A swimming pool wall formed from extruded aluminum panels comprising:
(a) a plurality of interleavable panels, each panel having a pair of parallel edges, one of said edges defining a male joint member and the other of said edges defining a female joint member, each said male joint member being loosely and lockingly longitudinally interleavable with an adjacent female member when said adjacent panels have a first predetermined orientation relative to each other, and
(b) rigid locking means secured to each said panel external of said male and female joint members and responsive to rotation of an adjacent pair of panels in a predetermined direction relative to each other for placing said interleaved male and female joint members in a second predetermined orientation and in rigid locking intimate contact with each other.

8. A wall as set forth in claim 7 wherein each said male joint member includes a cam follower and each said female joint member includes a cam whereon a said cam follower rides during said rotation.

9. A wall as set forth in claim 8 wherein each said male joint member includes an arrow shaped portion with inwardly extending flanges substantially symmetrical about the plane of the panel and said female joint member includes a pair of inwardly directed flanges spaced apart at their inward ends a distance less than the length of said flanges of said arrow and substantially symmetrical about the plane of the panel.

10. A wall as set forth in claim 9 wherein said cam is formed at the interior portion of one of said flanges forming said female joint member and said cam follower is a flange integral with said panel outwardly directed.

11. A wall as set forth in claim 7 wherein each said male joint member includes an arrow shaped portion with inwardly extending flanges substantially symmetrical about the plane of the panel and said female joint member includes a pair of inwardly directed flanges spaced apart at their inward ends a distance less than the length of said flanges of said arrow and substantially symmetrical about the plane of the panel.

12. A wall as set forth in claim 11 wherein said cam is formed at the interior portion of one of said flanges forming said female joint member and said cam follower is a flange integral with said panel outwardly directed.

* * * * *